3,066,061
PROCESS FOR PREPARING BONDED FIBROUS
BODIES AND PRODUCT THEREOF
Nathaniel M. Winslow, 2115 Riverside Drive,
Cleveland 7, Ohio
No Drawing. Filed July 15, 1959, Ser. No. 827,165
15 Claims. (Cl. 154—44)

This invention relates to bodies or batts comprising fibres and bonding resins. More particularly it relates to such bodies in which the fibers are highly dehydrated inorganic substances such as glass, mineral wool, or spun aluminum oxide. Still more particularly it relates to fibrous bodies or batts in which the fibers are loosely packed, being bonded at occasional points but for the most part being held at a distance from each other to provide spaces between the fibers.

In most uses where fibers and resins are used together to form structural materials, every effort is made for reasons of strength, density, and impermeability to have the fibers close together, and to have enough resin present to completely coat the fibers and firmly bond them at all points and to completely fill the inter-fiber space. Examples are the laminates or molded materials in which the filler is a chopped fiber. However, a wide field of application requires that the fibers be loosely packed to provide a porous structure. Examples are the filter batts used for the permeation of air, and insulation which may be used in the walls of buildings or on steam equipment.

In the manufacture of insulation batts or other loosely-packed fibrous bodies employing glass and other mineral fibers, the ideal arrangement is to have the fibers bonded with the resin at few-spaced-apart points of contact so that there is a maximum of space between the fibers and minimum of resin. If a resin can be provided which will not readily wet or spread over the fiber surface but will lodge only at points of the crossing or contact of the fibers while at the same time providing a strong bond at such points, important results will be achieved.

An economic advantage is obtained in that the resin required to cover the entire length of the fibers is saved. Furthermore, the absence of resin over the length of the fibers provides the maximum resilience and porosity between the fibers which is important for such uses as filtration, insulation, etc. Furthermore, resin spread over the full length of the fibers would be highly exposed to the attack of any corrosive environment, especially oxygen in the air.

An undesirable result with batt structures now produced through the use of conventional resins is the self-sustained burning or "punking" which occurs during periods of storage. Under heated conditions, the resins give a sustained burning or punking which disrupts the batt structure.

I have discovered that a highly resilient batt in which the fibers are strongly bonded can be produced which will not support combustion and which is not subject to punking through the use of a resin having low wetting properties with respect to the dehydrated mineral fibers, while at the same time having high thermal resistance, the resin forming only about the points of crossing and contact between the fibers to produce slings or ligatures thereabout. Such ligatures form extremely strong bonds at such points of attachment.

An object of the present invention is to provide a batt structure overcoming the disadvantages above recited and having the advantages above described. A further object is to provide a process and product in which the non-wetting characteristic of a thermosetting resin is employed to unite highly dehydrated mineral fibers only at points of crossing or widely-spaced points of contact so that, upon thermosetting, strong and thermal-resistant ligatures are provided uniting the fibers to form a light and highly resilient body. A still further object is to provide a resin adapted to be employed with highly dehydrated mineral fibers and having little tendency to wet such fibers while, at the same time, upon curing, interlocking said fibers at spaced points to form a tightly bound fibrous body. Other specific objects and advantages will appear as the specification proceeds.

The fibers which I prefer to employ may be mineral fibers which because they have been heated to very high temperatures in the process of manufacture have reached a relatively high degree of dehydration. Examples of these are dehydrated fibers, such as glass fibers, mineral wool, spun aluminum oxide, and the like. The resulting batt or body is useful as an insulation batt or as a body for the filtration of air, as a dust filter, and for many well known purposes.

The resin may be any suitable, preferably thermosetting, resin which has the property of not strongly wetting the fibers but which clings about contacting or crossing fibers to form ligatures or slings thereabout and which, on thermosetting, forms an extremely strong bond and preferably a bond which has high thermal resistance.

The resin or resinous material is preferably a cured, essentially hydrocarbonaceous material, solid at 25° C., having less than 35% benzene-soluble components, and manifesting no fluidity at 375° C. It has an Adams resistance rating of at least 90 when treated with 20% sodium hydroxide at 100° C. It yields a carbon residue of at least 65% and substantially less than 100% by weight when heated to 950° C. in the absence of oxygen.

Such thermoset resinous compositions may be produced by heating a partially cured, essentially hydrocarbonaceous resinous material which is thermosetting, solid at 25° C., and has 25 to 60% of benzene-soluble components. Preferably, the thermosetting resins have a draw point within the range of 200° and 260° C. and benzene-soluble components of 35 to 45%. The heating of the hydrocarbonaceous, thermosetting resin is conducted at a temperature between 165° and 400° C. and is continued until the thermosetting resin is converted into a substantially infusible thermoset resin. The thermoset stage is indicated by the resinous material not manifesting fluidity when heated to 375° C. Within the broad range of 165° and 400° C. for the heating, the thermosetting resin may be heated at a temperature between 250° and 350° C., preferably between 275° and 325° C., and most desirably at about 300° C. The heating is continued until the thermosetting resin is converted into a substantially infusible thermoset resin.

The resin is preferably formed from the pitch herein described, but may also be prepared from materials derived from pitch having at least three rings in benzhomologous relationship (including phenanthrene, chrysene, and anthracene).

The partially cured, essentially hydrocarbonaceous thermosetting resinous material used for the production of the thermoset resinous compositions of this invention may be prepared by mixing a hydrocarbonaceous pitch, more particularly later described, with an oxidizing agent, such as a dinitrobenzene, and heating the mixture within the range of 165° to 400° C. until the reaction product has a draw point within the range of 150° to 275° C. and contains 25 to 60% of benzene-soluble components. For example, the mixture of the hydrocarbonaceous pitch and the oxidizing agent may be heated at a temperature within the range of 185° to 250° C. until the reaction mixture has a draw point within the range of 200° to 260° C. and contains 35 to 45% of benzene-soluble components. A convenient procedure is to heat the mixture of the hydrocarbonaceous pitch and the oxidizing agent to a temperature within the range of 165° and 275° C. without excessive foaming, and continuing the heating until the rate of cure of the mixture decreases upon further heating. Desirably, the heating is continued until the rate of increase of the draw point of the reaction product is less than 3° C. per hour while the temperature is maintained substantially constant. One most desirable procedure is to start heating the mixture of pitch and oxidizing agent at 165° to 180° C. and then to increase the temperature within the range of 200° to 250° C. at a rate sufficiently slow to avoid excessive foaming of the reaction mixture, and finally continuing the heating until the draw point of the reaction product is within the range of 150° to 275° C.

The thermoset resinous compositions of this invention may also be produced by mixing a hydrocarbonaceous pitch, as later described, with an oxidizing agent such as a polynitrobenzene, for example, a dinitrobenzene, and heating the mixture within the range of 165° and 400° C. until the reaction product does not manifest fluidity when heated to 375° C. For example, the hydrocarbonaceous pitch is mixed with an oxidizing agent, heated within the range of 165° and 275° C. without excess foaming of the mixture, and the heating is continued until the rate of cure decreases upon further heating at a constant temperature. Further heating is continued between 250° and 350° C. until the reaction mixture does not manifest fluidity when heated to 375° C. The resinous composition at this point is resinous and infusible. The final cure is then effected by heating preferably at a temperature between 275° and 325° C. and most desirably at 300° C. until the partially cured resin is converted into a substantially infusible resinous composition.

It is essential that the hydrocarbonaceous pitches used as starting materials for the production of the thermoset compositions of this invention, as well as for the partially cured thermosetting resins employed for the production of such thermoset compositions, have the following characteristics: Solid, semi-solid or viscous liquid materials, essentially hydrocarbon in nature and susceptible to softening, melting or lowering of viscosity on application of heat, which (a) have at 25° C. a specific gravity of 1.02 or greater referred to water at 4° C., and (b) when heated for 72 hours at 450° C. in a closed vessel where distillation is not possible, will yield at least 60%, based on the weight of the pitch so heated, of solid material which, on further heating to 950° C. at atmospheric pressure but in the absence of oxygen, will yield a carbon residue amounting to at least 80% of the solid product from the pitch.

Of the pitches presently available on the market, the class useful in the invention comprises chiefly the coal tar pitches. However, some pitches within the class have been produced from other sources, notably mineral oil pitches, or petroleum pitches. Some coal tars, particularly the refined coal tars, also are included within the class useful for the practice of this invention. Also included are hydrocarbon compounds which fall within the class of hydrocarbonaceous pitches defined above. Materials which will not meet the above requirements for hydrocarbonaceous pitches are saponifiable pitches, such as stearine, wool grease, and bone pitches and most of the asphalts, both manufactured and natural.

In accordance with this invention, the thermoset condition is reached if the material when heated very rapidly to a high temperature fails to manifest fluidity. A convenient test to determine whether a resin manifests fluidity is to place a few particles or granules of crushed resin on a metal block pre-heated to 375° C. If in the course of a few seconds the irregular particles coalesce or contact in the manner of a liquid into minimum volume and approach spherical shape, the resin has not been thermoset. If, on the other hand, the irregular shape of the particles is retained, the material is thermoset, fully cured, and infusible even though further hardening may occur.

Perhaps the most useful compositions of this invention are those containing, in addition to the resinous materials, components such as fillers. Such compositions find extensive use in the production of molded articles. The molded articles are produced from molding compositions comprising mixtures of a filler and a partially cured, essentially hydrocarbonaceous thermosetting resinous material. The partially cured, essentially hydrocarbonaceous thermosetting resinous material is solid at 25° C., has a draw point within the range of 150° to 275° C., and preferably 200° to 260° C., and has 25 to 60%, and preferably 35 to 45%, of benzene-soluble components. The molding compound comprising the partially cured resinous material and filler may be subjected to superatmospheric pressures, such as pressures of 1000 to 4000 lbs. per square inch, and to temperatures between 250° and 350° C., preferably at 275° to 325° C., and most desirably at about 300° C. until the partially cured resinous material is converted into a substantially infusible thermoset resin.

In accordance with an aspect of this invention, thermoset compositions are produced from precured thermosetting compositions containing a filler and a partially cured, essentially hydrocarbonaceous thermosetting resinous material. The thermosetting precured resinous composition is solid at 25° C., manifests at 300° C. plasticity when subjected to 500 lbs. per square inch pressure and no significant plasticity when subjected to 5 lbs. per square inch pressure, and evolves no significant amounts of gaseous products when completely cured. The precured thermosetting composition containing preferably a filler is completely cured, desirably by heating at a temperature between 250° and 350° C. and heating is continued until the precured resinous material is converted into a substantially infusible thermoset resin. Alternatively, the precuring may be conducted in the process of producing a thermoset resin composition from a partially cured hydrocarbonaceous thermosetting resin previously described. Such hydrocarbonaceous resinous material is solid at 25° C., and has 25 to 60% of benzene-soluble components. In the production of a thermoset composition by this alternative process, a filler and the partially cured hydrocarbonaceous resinous material is mixed, and the resulting mixture is heated to a temperature of 165° to 400° C., and preferably within the range of the draw point of the resinous material and 400° C., to cause the resinous material to flow. The precuring is effected by heating for a period sufficient to increase substantially the cure of the resinous material and to reduce the volatile material significantly. Complete cure may be effected by further heating the resulting composition at 250° and 350° C. Desirably, such final cure is effected at a lower temperature than that of the precure heating.

A convenient method of ascertaining plasticity of the precured thermosetting composition at 300° C. is by subjecting one disc of the material to be tested at 300° C. to a pressure of 5 lbs. per square inch and another disc of the same material at 300° C. to a pressure of 500 lbs. per square inch. Conveniently, the discs have a cross-sectional area of about 4 square inches and a thickness of about ⅜". The discs are formed by compacting at room temperature the material to be tested in a circular mold at about 2000 lbs. pressure per square inch. One of the discs is placed between the platens of a molding press which has been brought to a temperature of 300° C. A pressure of 5 lbs. per square inch is then applied as quickly as possible thereafter, and the flow of the material in the disc is determined by the change in the thickness during a ten minute period under the 5 lbs. per square inch pressure. The precured thermosetting composition should not manifest any significant plasticity at 5 lbs. per square inch pressure.

A similar disc of the material is then inserted between the platens, maintained at 300° C., and a pressure of 500 lbs. per square inch is rapidly applied to the disc. Plasticity again is determined by the change in thickness of the disc. The precured thermosetting composition should manifest significant plasticity at 500 lbs. per square inch pressure.

The following examples will set out methods of making a resin which may be satisfactorily employed in the bonding of the mineral fibers, and the later examples will set out the processes in which the fibers are bonded with the resin.

EXAMPLE 1

A "medium" pitch obtained from a tar distiller melted at about 100° C. was soluble in benzene to the extent of 75.1%.

This coal tar pitch, as well as all of the other pitches employed in the examples disclosed herein, would comply with all of the requirements for the hydrocarbonaceous pitch heretofore described. More particularly, each of the pitches described in the examples has a specific gravity of 1.02 or greater and when heated for 72 hours at 450° C. in a closed vessel where distillation is not possible, would yield at least 60% of solid material based on the weight of the pitch so heated and that solid material, on further heating to 950° C. at atmospheric pressure but in the absence of oxygen, would yield a carbon residue amounting to at least 80% of the solid products from the pitch.

A mixture of 4 parts of this "medium" pitch and one part of m-dinitrobenzene is heated at 205° C. for one week. The product was a shiny black solid, the weight of which was 86.8% of the combined weight of pitch and m-dinitrobenzene, or 108.5% of the pitch used. This product is soluble in benzene to the extent of only 10.0%. The material shows no signs of melting when heated. Even when ground to a fine powder and heated to 950° C., the carbon residue is a loose powder, showing that softening, which would have caused the particles to adhere, has not taken place. The weight of the carbon residue is about 72% of the thermoset resin heated.

The benzene solubility is measured by refluxing for one hour with 100 cc. of benzene a one gram sample of resin which has been ground to pass a 65 mesh screen. After refluxing, the undissolved residue is brought upon a weighed filter, washed with additional benzene, dried at 100° to 110° C., and weighed.

In Example 1 a reaction occurs which converts the fusible, relatively soluble pitch to an infusible solid, for when the same pitch is heated in the absence of air under the same conditions of time and temperature except that no m-dinitrobenzzene is present, the product shows practically no change from the starting material, being soluble in benzene to the extent of 74.0% and being like the original pitch readily fusible at moderate temperatures.

Regardless of the mechanism of the reaction, essentially 100% of pitch substance can be converted into a resin, as identified by low solubility and volatility and by loss of fusibility, by treatment with one or more of a class of reagents under conditions of time and temperature adequate for complete reaction as illustrated in Example 2.

EXAMPLE 2

Samples of the same pitch as used for the preparation of Example 1 are mixed with oxidizing agents in the proportions shown in the tabulation below. The mixtures are heated, while protected from air, under conditions of time and temperature also shown in the tabulation. The products are weighed to determine yield, and then characterized by solubility in benzene.

| Reagent used | Amount of reagent, 1% of pitch | Conditions of heating | | Characteristics of product | |
|---|---|---|---|---|---|
| | | Time, hours | Temperature, °C. | Solubility in benzene, percent | Yield, percent of pitch |
| m-Dinitrobenzene | 25.0 | 168 | 205 | 10.0 | 108.5 |
| Do | 11.1 | 96 | 225 | 35.5 | 102.3 |
| Picric acid | 17.8 | 72 | 225 | 9.5 | 110.5 |
| Sulfuric acid | 11.3 | 72 | 225 | 39.5 | 99.4 |
| Benzene disulfonic acid | 15.8 | 48 | 225 | 34.0 | 105.6 |
| Do | 15.8 | 48 | 250 | 32.0 | 103.2 |
| Nitric acid | 6.2 | 120 | 205 | 35.0 | |
| Ammonium nitrate | 9.3 | 120 | 205 | 46.5 | 99.8 |
| None | None | 168 | 205 | 74.0 | 99.9 |

The preparations of Example 2 show that a wide variety of oxidizing agents, including oxidizing acids, oxidizing salts, and organic compounds such as nitro compounds and sulfonates, are effective in varying degrees for effecting the polymerization of pitch, as indicated by decreased solubility and volatility. The salts are less effective than the corresponding acids, perhaps due to the fact that they are not soluble in the pitch. The most useful reagents for carrying out the invention are oxidizing acids such as sulfuric and nitric and organic compounds such as sulfonates and nitro compounds.

The following considerations strengthen the hypothesis that oxidation is the prime function of the reagents which was found to be useful for converting pitches to resins. If the polymerization actually is produced or promoted by oxidation, then a like degree of polymerization should be effected by use of equivalent amounts (with respect to oxidizing capacity) of oxidizing agent regardless of the identity of the agent used. With a mixture as complex as pitch, and with oxidizing agents which can be reduced in several different ways or to several different levels, it obviously is not possible to identify equivalent amounts of oxidizing capacity with the precision possible in ordinary analytical chemistry. Nevertheless Equations 1 and 2 below are believed to represent plausible reactions for two of the reagents which have been found useful in the practice of the invention:

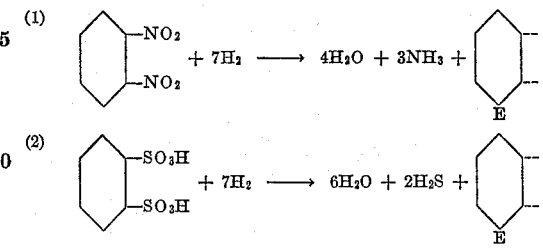

These equations represent that one mole of m-dinitrobenzene or one mole of benzene disulfonic acid removes seven moles of hydrogen from the pitch. This hydrogen is eliminated as water, ammonia or hydrogen sulfide, while the carbon ring of either reagent, after removal of oxidizing functional groups, is designated as the free radical E which may be capable of combining in the polymer molecule.

Assuming these equations correctly represent the reaction of the two oxidizing agents (and that similar equations could be written for other oxidizing agents), a gram equivalent weight of oxidizing agent for purposes of forming the novel resins of this invention can be defined as the number of grams of reagent required to oxidize one gram molecular weight of hydrogen. Thus one gram molecular weight of m-dinitrobenzene or of benzene disulfonic acid reacts with 7 gram molecular weights of hydrogen and an equivalent weight of dinitrobenzene would be 24 grams, of benzene disulfonic acid 34 grams. The reaction of an equivalent amount of each of the two oxidizing agents with a like amount of pitch should yield resinous products of approximately the same degree of polymerization. The correctness of this conclusion was proven by the preparations of Example 3 wherein m-dinitrobenzene and benzene disulfonic acid were reacted in the proportion of approximately 0.4 gram equivalent weight of oxidizing agent per 100 grams of pitch.

EXAMPLE 3

To 18 grams of the pitch used in Examples 1 and 2, 2.00 g. of m-dinitrobenzene are added. To a duplicate sample of pitch 2.84 g. of benzene disulfonic acid are added, and the two preparations are heated for 24 hours at 225° C. Similar pairs of reactions are carried out with 48, 72, and 96 hours of heating, respectively. The solubility of each resin preparation is determined as a measure of the degree of polymerization.

| Resins from 18 g. pitch and 2.00 g. m-dinitrobenzene | | Resins from 18 g. pitch and 2.84 g. benzene disulfonic acid | |
| --- | --- | --- | --- |
| Time of heating at 225° C., hours | Solubility in benzene, percent | Time of heating at 225° C., hours | Solubility in benzene, percent |
| 24 | 35.0 | 24 | 33.5 |
| 48 | 35.0 | 48 | 35.5 |
| 72 | 34.0 | 72 | 34.0 |
| 96 | 33.5 | 96 | 33.5 |

The close correspondence of solubilities shows that approximately the same degree of polymerization is effected by 2.84 g. of benzene disulfonic acid as by 2.00 g. of m-dinitrobenzene under like conditions of reaction. Since these amounts are chosen on the basis of predicted oxidation reactions, the preparations of Example 3 confirm the hypothesis that the prime function of the reagents effective for the formation of the novel resins is facilitation of hydrogen removal by oxidation.

In Example 3, solubility is used as a criterion of degree of polymerization. Other criteria could be used. Thus, it is characteristic of all polymerization systems that, as degree of polymerization becomes progressively higher, not only does solubility decrease, but also volatility falls and fusion of the polymerized product becomes progressively more difficult, requiring progressively higher temperatures, or, in some polymerization systems such as that by which the novel resins are formed, becoming impossible at any temperature.

EXAMPLE 4

Samples of resin are prepared as in Example 1, using the same pitch, same proportion of reagent to pitch, and the same method of heating. The samples are heated at 185° C. for different time intervals as shown below, and the yield and solubility in benzene are determined for each product. Results compare as follows:

| Time of heating, hours | Yield of resin, percent of pitch used | Characteristics of product—Solubility in benzene, percent |
| --- | --- | --- |
| 12 | 119.1 | 51.0 |
| 24 | 117.4 | 46.0 |
| 72 | 115.4 | 38.0 |
| 120 | 112.5 | 30.0 |
| 168 | 112.8 | 26.0 |
| 240 | 113.6 | 24.5 |
| 336 | 113.2 | 12.5 |

The data of Example 4 shows that solubility decreased with increasing time of heating.

Fusibility, or melting-point, is not a property which can be measured like solubility. Even the pitches of commerce, before reaction in accordance with this invention for forming polymerization products, do not have true melting points. Rather, they soften and liquefy over a range of temperature, and the so-called melting-points of pitches are determined by empirical methods well known in the art. After a moderate degree of polymerization, even these empirical methods are inapplicable, although the ability to fuse may persist after a rather extensive polymerization. A test was therefore devised to detect the ability of the highly polymerized resins to fuse even though a melting-point cannot be determined. This test consists of grinding a sample to a fine powder, e.g., to pass a 65 mesh screen. When the fine powder is rapidly heated to 950° C., it will fuse into a continuous mass or at least adhere together before conversion to carbon if it is capable of fusion.

This test applied to the resin preparations of Example 4 shows the first four to be fusible, i.e., fusibility disappearing after about 120 hours of heating. The last three show no signs of fusibility. Thus, in the practice of this invention, the polymerization is characterized by decreased fusibility and solubility. However, fusibility and solubility are not precisely correlated, since as polymerization increases some solubility may still be measured even after all signs of fusibility have disappeared.

In Examples 1, 2, 3 and 4, the preparation of the resins has been illustrated by use of a single pitch. However, the preparation of the resins is not limited to the use of a single starting material, pitches of the class defined herein being generally useful as starting materials. Examples of the use of other pitches are shown in Example 5.

EXAMPLE 5

Intimate mixtures of each of several pitches and m-dinitrobenzene are heated, in substantially the same manner as in preceding examples, to effect polymerization. Identity of the pitches and the exact conditions of reaction are given in the following tabulation:

| Resin No. | Starting material | Amount of m-dinitrobenzene, percent of pitch | Conditions of preparation | | Yield, percent of pitch | Solubility in benzene, percent |
| --- | --- | --- | --- | --- | --- | --- |
| | | | Reaction time, hours | Reaction temperature, °C. | | |
| 1 | A soft coal tar pitch. | 11.1 | 72 | 205 | 101.0 | 44.5 |
| 2 | | 25.0 | 72 | 205 | 118.0 | 15.5 |
| 3 | A medium pitch (different material from that used in other examples). | 11.1 | 72 | 225 | 103.0 | 35.0 |
| 4 | | 17.7 | 72 | 225 | 104.5 | 11.0 |
| 5 | | 25.0 | 72 | 225 | 116.0 | 7.3 |
| 6 | A hard coal tar pitch. | 11.1 | 72 | 205 | 104.0 | 35.4 |
| 7 | | 11.1 | 72 | 225 | 105.5 | 29.5 |
| 8 | | 17.7 | 72 | 225 | 107.0 | 5.0 |
| 9 | | 25.0 | 72 | 225 | 117.0 | 1.5 |

Thus far it has been disclosed that the practice of this invention requires, first, selection of a suitable hydrocarbonaceous pitch starting material and, second, reaction therewith of any of a wide variety of oxidizing reagents. The degree of polymerization is dependent on the amount of reagent used. The reaction time and temperature must be sufficient if complete reaction is to be obtained. The effects of time, temperature, and amount of reagent, using one pitch and one reagent for the purpose, will now be demonstrated more precisely.

To this end, the preparations of Example 6 have been arranged to show the effect of time at reaction temperature. In these preparations, a "medium" pitch melting at about 100° C. is used with the indicated amounts of reagent (m-dinitrobenzene), and the time at reaction temperature is varied. At each level of reagent the time is increased until no further polymerization, as measured by solubility, can be observed, or until reaction is proceeding only at a very slow rate.

EXAMPLE 6

*Resins Prepared With "Medium" Pitch and m-Dinitrobenzene as Oxidizing Reagent*

| Amount of reagent, percent of pitch | Reaction temperature, ° C. | Reaction time, hours | Resin characteristics | |
|---|---|---|---|---|
| | | | Yield, percent of pitch | Solubility in benzene, percent |
| 5.3 | 185 | 24 | 102.9 | 53.0 |
| | | 48 | 102.5 | 49.2 |
| | | 72 | 102.6 | 49.5 |
| | | 96 | 102.4 | 48.0 |
| | | 120 | 102.4 | 47.4 |
| | | 168 | 102.0 | 48.7 |
| 11.1 | 165 | 24 | 107.3 | 57.0 |
| | | 48 | 105.6 | 51.3 |
| | | 72 | 105.2 | 48.0 |
| | | 96 | 104.9 | 48.3 |
| | | 120 | 105.5 | 48.0 |
| | | 168 | 104.6 | 45.0 |
| | | 336 | 102.4 | 37.0 |
| 11.1 | 185 | 12 | 107.7 | 49.0 |
| | | 24 | 107.6 | 46.5 |
| | | 72 | 106.1 | 40.5 |
| | | 120 | 105.1 | 32.5 |
| | | 168 | 104.1 | 31.0 |
| | | 240 | 104.5 | 30.5 |
| | | 336 | 104.5 | 29.4 |
| 11.1 | 205 | 12 | 104.0 | 41.0 |
| | | 24 | 103.1 | 39.5 |
| | | 48 | 105.2 | 36.5 |
| | | 72 | 103.1 | 35.0 |
| | | 96 | 102.4 | 35.5 |
| | | 120 | 102.3 | 36.5 |
| | | 168 | 103.1 | 33.5 |
| 11.1 | 225 | 8 | 103.3 | 40.0 |
| | | 16 | 102.3 | 36.0 |
| | | 24 | 102.1 | 35.0 |
| | | 32 | 102.2 | 35.0 |
| | | 48 | 101.1 | 34.0 |
| | | 72 | 102.0 | 33.5 |
| | | 96 | 102.2 | 35.5 |
| | | 120 | 101.2 | 30.0 |
| 11.1 | 250 | 4 | 95.4 | 35.0 |
| | | 8 | 99.7 | 34.7 |
| | | 12 | | 31.0 |
| | | 16 | 98.3 | 27.0 |
| | | 24 | 97.3 | 26.5 |
| | | 48 | 92.7 | 19.5 |
| | | 72 | 96.0 | 16.0 |
| | | 96 | 92.5 | 21.0 |
| 25.0 | 185 | 12 | 118.7 | 51.0 |
| | | 24 | 117.4 | 46.0 |
| | | 72 | 115.5 | 38.0 |
| | | 120 | 112.6 | 30.0 |
| | | 168 | 112.9 | 26.0 |
| | | 240 | 113.7 | 24.5 |
| | | 336 | 112.9 | 22.5 |
| 25.0 | 225 | 16 | 114.2 | 25.0 |
| | | 24 | 116.3 | 28.5 |
| | | 32 | 115.6 | 11.5 |
| | | 48 | 115.3 | 11.4 |
| | | 120 | 113.3 | 4.5 |

Taking solubility as the measure of completeness of the polymerization reaction, the tabulation of Example 6 shows:

(a) With any given amount of reagent and reaction temperature, a certain time interval is required before the reaction is complete.
(b) At a given reaction temperature, the time required becomes greater as the amount of reagent is increased. Thus at 185° C., about 72 hours are required with 5.3% of reagent, 168 hours with 11.1%, and 336 hours with 25%. At 225° C., 48 hours are required with 11.1% of reagent, 72 hours or more with 25%.
(c) With a given amount of reagent, the time required becomes less as the reaction temperature is raised. Thus with 11.1% of reagent, 504 hours or more are required at 165° C., 168 hours at 185° C., 72 hours at 205° C., and 48 hours at 225° C. At 250° C. also, it appears that 48 hours are required. However, it is to be noted, first, that the final solubility is of a lower order than for resins made at lower temperatures, and, second, that the yields are consistently below 100% of the starting material. It is believed that the incidence of some additional reaction, beyond that occurring at lower temperatures between pitch and reagent, thus is indicated.

To demonstrate the effect of temperature in carrying out the invention, this condition has been made the variable in the preparations tabulated as Example 7. Herein the reaction times vary, but always are sufficiently long so that further polymerization at the indicated temperature proceeds only at a very slow rate.

EXAMPLE 7

*Resins Prepared With "Medium" Pitch and m-Dinitrobenzene as Oxidizing Reagent*

| Amount of reagent, percent of pitch | Reaction time, hours | Reaction temperature, ° C. | Resin characteristics | |
|---|---|---|---|---|
| | | | Yield percent of pitch | Solubility in benzene, percent |
| 5.3 | 504 | 165 | 101.6 | 56.4 |
| | 168 | 205 | 99.3 | 42.0 |
| | 120 | 225 | 96.3 | 36.5 |
| | 96 | 250 | 90.9 | 38.5 |
| | 18 | 275 | 87.6 | 35.5 |
| | 18 | 300 | | 37.8 |
| | 18 | 325 | 72.0 | 29.0 |
| 8.1 | 504 | 165 | 103.9 | 37.3 |
| | 168 | 205 | 101.8 | 37.5 |
| | 120 | 225 | 99.6 | 35.0 |
| | 96 | 250 | 92.9 | 32.0 |
| 11.1 | 504 | 165 | 103.1 | 34.5 |
| | 336 | 185 | 104.6 | 29.4 |
| | 168 | 205 | 102.9 | 33.5 |
| | 120 | 225 | 101.2 | 30.2 |
| | 96 | 250 | 92.4 | 21.0 |
| | 42 | 275 | 89.1 | 15.5 |
| | 36 | 300 | 86.7 | 13.0 |
| | 30 | 325 | 85.1 | 16.0 |
| | 24 | 350 | 80.8 | 10.5 |
| | 18 | 375 | | 4.7 |
| | 12 | 400 | 68.7 | 3.5 |
| 14.3 | 504 | 165 | 104.5 | 32.0 |
| | 168 | 205 | 104.2 | 28.0 |
| | 120 | 225 | 102.9 | 17.5 |
| | 96 | 250 | 93.8 | 7.0 |
| 17.7 | 504 | 165 | 106.4 | 33.5 |
| | 168 | 205 | 105.2 | 15.5 |
| | 120 | 225 | 103.2 | 12.0 |
| | 96 | 250 | 95.7 | 4.0 |

Again, as in previous discussion of Example 6, taking solubility as the measure of degree of polymerization, the tabulation of Example 7 shows:

(a) With any given proportion of reactant, the tendency with increasing reaction temperature is toward a greater degree of polymerization.
(b) However, at reaction temperatures of 225° C. or lower, the degree of polymerization obtained when the reaction is completed is approximately the same, regardless of temperature, if the proportion of reagent is not greater than 11.1%, as indicated by essentially constant solubility. It is to be understood, of course, that in interpreting the solubilities of the large number of preparations in Example 7, some allowance must be made for errors, such as chance experimental error, accidental admission of air during reaction, etc. Experience has shown that a variation of 2 to 3% in solubility is to be expected.
(c) At reaction temperatures of 250° C. or higher, definite and characteristic differences in the products are observed. Yield drops suddenly, and there is a marked decrease in solubility and volatility. It is believed that these sudden changes indicate the incidence of a further step occurring in the polymerization reaction by which the novel resins are formed at temperatures of 225° C. or lower. It is recognized that evaporation either of starting material or reagent could also explain the decrease in yield. Probably both causes are effective, and the invention is not limited by this interpretation.
(d) Yields are markedly greater at temperatures below 250° C. than at this temperature or above. This drop in yield is observed regardless of the amount of reagent used, although it is less with higher proportions of reagent. By contrast, the degree of polymerization increases markedly, even at temperatures below 250° C., if sufficient reagent is used.

The observed effects of increasing temperature in the practice of this invention may be explained as follows: Regardless of the reaction mechanism, the reaction by which the novel resins are formed from pitch and suitable reagents proceeds at an appreciable rate at 165° C., and at an increasing rate as the temperature is raised. In addition to the effect of temperature on rate of reaction, higher temperatures cause a greater extent of reaction; i.e., greater effectiveness of the reagents. This second effect of temperature is very noticeable at 250° C. or higher, but may be appreciable at lower temperatures if sufficient reagent is present.

In accordance with this invention, resins may thus be formed from the defined pitches and reagents in the range of between 165° and 400° C. The higher yields are obtained at temperatures below 250° C., although both yield and degree of polymerization depend on the amount of reagent used. In forming the novel resins, the amount of reagent should be chosen on the basis of what is required with respect to yield and degree of polymerization.

To demonstrate further the effect of the amount of reagent used, there is arranged the tabulation of Example 8. Herein, as in Examples 6 and 7, the time of reaction always is sufficient to effect essentially complete reaction. The preparations are arranged to illustrate the effect, at several temperatures, from 165° to 400° C., of increasing the proportion of reagent up to 25% of the weight of the pitch used.

EXAMPLE 8

*Resins Prepared With "Medium" Pitch and m-Dinitrobenzene as Oxidizing Reagent*

| Reaction temperature, ° C. | Reaction time, hours | Amount of reagent, percent of pitch | Characteristics of resin | |
|---|---|---|---|---|
| | | | Yield, percent of pitch | Solubility in benzene, percent |
| 165 | 50 | 5.3 | 101.3 | 56.5 |
| | | 8.1 | 102.1 | 37.3 |
| | | 11.1 | 102.7 | 34.5 |
| | | 14.3 | 104.3 | 32.0 |
| | | 17.7 | 106.4 | 33.5 |
| | | 25.0 | 117.3 | 31.0 |
| 185 | 336 | 11.1 | 104.6 | 29.4 |
| | | 25.0 | 120.5 | 12.5 |
| 205 | 168 | 5.3 | 99.7 | 42.0 |
| | | 8.1 | 101.9 | 37.5 |
| | | 11.1 | 103.0 | 33.5 |
| | | 14.3 | 104.8 | 28.0 |
| | | 17.7 | 105.2 | 15.5 |
| | | 25.0 | 115.3 | 10.0 |
| 225 | 120 | 5.3 | 96.1 | 36.5 |
| | | 8.1 | 97.0 | 35.0 |
| | | 11.1 | 101.1 | 30.2 |
| | | 14.3 | 102.9 | 17.5 |
| | | 17.7 | 100.1 | 12.0 |
| | | 25.0 | 114.5 | 4.5 |
| 250 | 96 | 5.3 | 89.7 | 38.5 |
| | | 8.1 | 92.9 | 32.0 |
| | | 11.1 | 92.4 | 11.0 |
| | | 14.3 | 93.6 | 7.0 |
| | | 17.7 | 95.8 | 4.0 |
| | | 25.0 | | 2.0 |
| 275 | 18 | 5.3 | 87.6 | 35.5 |
| | 42 | 11.1 | 89.1 | 15.5 |
| | 42 | 25.0 | | 3.0 |
| 300 | 18 | 5.3 | | 37.8 |
| | 36 | 11.1 | 86.7 | 13.0 |
| | 36 | 25.0 | 105.4 | 3.0 |
| 325 | 18 | 5.3 | 72.0 | 29.5 |
| | 30 | 11.1 | 85.1 | 16.0 |
| | 30 | 25.0 | 104.5 | 2.5 |
| 350 | 24 | 11.1 | 80.8 | 10.5 |
| | | 25.0 | 101.1 | 1.5 |
| 375 | 18 | 11.1 | | 4.7 |
| | | 25.0 | 105.3 | 1.0 |
| 400 | 12 | 11.1 | 68.7 | 3.5 |
| | | 25.0 | 102.2 | 1.0 |

The tabulation of Example 8 demonstrates again the various effects of time and temperature which have been shown by Examples 6 and 7, and more specifically illustrates the effect of proportion of reagent under any given conditions of reaction time and temperature. Thus:

(a) Increasing the amount of reagent always results in increased yield and higher degree of polymerization as measured by solubility.

(b) The effectiveness of any given amount of reagent appears to increase as the temperature is raised. For example, at 165° C., use of the smallest proportion indicated, 5.3% of the pitch, resulted in only limited polymerization. At higher temperatures, the effect of this small amount of reagent is greater. Similarly, use of a relatively large amount of reagent, e.g., 25%, had only a moderate advantage over 17.7% at 165° C., but at higher temperatures, even only 185° C., its effect becomes increasingly pronounced. Intermediate proportions of reagent, such as 14.3% or 17.7%, were of little advantage over 8.1 or 11.1% at lowest temperatures, but at higher temperatures of 205° and 225° C., the advantage of increased amount of reagent becomes more pronounced.

(c) There appears to be some proportion of reagent between 17.7 and 25% of the pitch at which the effect on yield of product becomes exaggerated. Thus, in the tabulation of Example 8, the yields obtained with 8.1, 17.7 and 25.0% can be compared. The difference in yield may be as little as 3% between the first two levels of reagent. In contrast, the difference in yield with 25% as compared with 17.7% is 10 to 15% of the pitch weight. Evidently as the concentration of the reagent is increased, the tendency on the part of the reagent molecules to be combined in the polymer molecule becomes suddenly more pronounced above a certain level of reagent.

The resinous products of this invention are prepared by reacting pitch with oxidizing reagents at elevated temperatures for a time sufficient to effect reaction. The pitch may be any of those falling within the class defined herein but because of commercial availability it is preferably a coal tar pitch. Although any oxidizing agent may be used which can be mixed with the pitch, there are, as has been heretofore explained, certain practical limitations which enter into the choice of an oxidizing agent. Preferably, the oxidizing agent should be one which may be intimately mixed with the pitch. In general, organic oxidizing agents and particularly those containing nitro groups such as aromatic polynitro compounds, are found desirable. Polynitrobenzene, and particularly m-dinitrobenzene, are preferable because of practical as well as theoretical considerations.

Although the proportion of oxidizing agent may vary considerably, as has been shown in the various examples, for best results the gram equivalent weight of the oxidizing agent with respect to each 100 grams of pitch may be between 0.2 and 1.0, preferably about 0.4. In terms of percentage, the proportion of oxidizing agent may be in the range of 5% to 25% of the weight of the pitch used.

The reaction or reactions by which the novel resins are formed proceed at increasing rate as the temperature is increased, up to about 350° to 400° C. At any selected temperature, the time required for reaction can be determined experimentally, and is dependent on the amount of reagent used. Choice of the amount of reagent must be based on the properties required for the resinous product (yield, solubility, fusibility), as illustrated by Examples 6, 7 and 8.

As heretofore set forth, to produce a thermoset resin from the defined pitch and the oxidizing agent, the reaction should be carried out at an elevated temperature below 400° C., the temperature ordinarily being between 165° and 400° C. Between 185° and 350° C. is the preferred temperature.

Although the thermoset resins of this invention are useful when they are formed from pitch as the starting material in a single step, they find even greater utility when they are produced from partially cured thermosetting forms. For instance, with reference to Example 4, resins such as the first four which are soluble to the extent of 30 to 50%, and which are fusible in some degree, can be converted to the infusible and relatively insoluble condition by further heating, either at the same temperature as that at which the relatively soluble and fusible products were prepared, or at a higher temperature. Conveniently in practical applications of the practice of this invention, the cure will be completed by heating for periods of a few minutes to perhaps an hour at temperatures of 250° to 350° C., preferably 275° to 325° C., and most desirably at about 300° C. The preparation of fully cured resins by both two-step and one-step reaction is illustrated in Example 9.

EXAMPLE 9

Partially cured resins are prepared using "medium" coal tar pitch of commerce of the class hereto defined as hydrocarbonaceous starting material, and m-dinitrobenzene as oxidizing reagent. Proportion of pitch to oxidizing reagent, also time and temperature of heating are varied as shown in the following tabulation to obtain a series of fusible and relatively soluble resinous products:

| Resin No. | Amount of m-dinitro-benzene, percent of pitch | Conditions of preparation | | Yield, percent of pitch | Solubility in benzene, percent |
|---|---|---|---|---|---|
| | | Reaction time, hours | Reaction temperature, °C. | | |
| 1 | 17.7 | 7.5 | 225 | 110.6 | 43.0 |
| 2 | 17.7 | 2.5 | 175 | 114.9 | 62.5 |
| 3 | 17.7 | 6 | 175 | 114.6 | 55.0 |
| 4 | 17.7 | 24 | 175 | 113.6 | 43.5 |
| 5 | 25 | 30 | 150 | 129.5 | 62.4 |
| 6 | 17.7 | .9 | 150 | 114.9 | 62.5 |
| 7 | 17.7 | 73 | 150 | 114.1 | 51.0 |
| 8 | 11.1 | 2.5 | 175 | 109.6 | 62.0 |
| 9 | 11.1 | 16.5 | 175 | 109.6 | 54.3 |
| 10 | 11.1 | 26 | 175 | 107.2 | 54.0 |

A sample of each of these resins is heated for ½ hour at 300° C., the cure being thus advanced to a relatively insoluble condition approaching full cure.

| Resin No. | Prepared from partially cured Resin No. | Yield, percent of partially cured resin | Solubility in benzene, percent | Carbon residue at 950° C., percent |
|---|---|---|---|---|
| 1-A | 1 | 94.7 | 19.0 | 78.5 |
| 2-A | 2 | 86.0 | 13.5 | 79.0 |
| 3-A | 3 | 90.5 | 14.0 | 70.0 |
| 4-A | 4 | 88.5 | 15.0 | 66.0 |
| 5-A | 5 | 87.5 | 19.0 | 81.0 |
| 6-A | 6 | 93.5 | 31.8 | 74.9 |
| 7-A | 7 | 91.5 | 31.0 | 71.1 |
| 8-A | 8 | 93.0 | 34.5 | 73.6 |
| 9-A | 9 | 93.5 | 32.0 | 67.0 |
| 10-A | 10 | 92.5 | 31.5 | 70.0 |

Fully cured thermoset resins can be prepared directly, in a single step, from hydrocarbonaceous pitch and oxidizing reagent as shown by the following preparations:

| Resin No. | Amount of m-dinitro-benzene, percent of pitch | Reaction time, hours | Reaction temperature, °C. | Yield, percent of pitch | Solubility in benzene, percent | Carbon residue at 950° C., percent |
|---|---|---|---|---|---|---|
| 11 | 17.7 | 168 | 205 | 105.2 | 15.5 | 70.0 |
| 12 | 14.3 | 120 | 225 | 102.9 | 17.5 | 68.3 |
| 13 | 17.7 | 96 | 250 | 95.7 | 4.0 | 73.0 |
| 14 | 25 | 36 | 300 | 105.4 | 3.0 | 76.0 |
| 15 | 25 | 24 | 350 | 101.5 | 1.5 | 79.4 |

In Example 9 the fully cured resins have been characterized by "carbon residue at 950° C." This value is determined for each fully cured resin by heating a sample of the material, contained in a covered crucible, to about 950° C. by exposing the crucible directly to the heat of a gas flame for a period of 10 minutes. The weight of the carbon residue left after this treatment, expressed as percent of the sample of resin, is the "carbon residue at 950° C." as tabulated in Example 9.

In addition to infusibility and relatively low solubility, hereinbefore discussed, a carbon residue value of at least 65% and substantially less than 100% by weight is characteristic of the thermoset resins of this invention. It will be evident that this value is a measure of volatility, i.e., as the carbon residue is greater the volatility is lower. It will also be evident that volatility, as thus measured, can never be zero even when the various products can be considered completely cured. Thus, with further reference to the carbon residue values of Example 9, a minimum volatility of about 20% is indicated. The material volatilized must consist largely of hydrogen and other products of pyrolytic decomposition of the resin molecules at the very high temperature (950° C.) used for the carbon residue determination. No organic resin would fail to be decomposed at such temperatures; hence, no resinous product could show zero volatility by this test.

Solubility of fully cured resins ranges from very low values of 2% or less up to values approaching 35%; e.g. the fully cured resins of Example 4. It is quite reasonable that some soluble material should remain even when polymerization has been completed. Such material might consist of a small proportion of unpolymerizable material present as impurity in the pitch used as starting material or it might be a minor by-product of the polymerization reaction which is not subject to further polymerization.

The resin therefore may be considered fully cured, infusible, relatively non-volatile and relatively insoluble (and herein these terms are used to so indicate) if it shows benzene solubility of less than 35%, carbon residue of at least 65% and substantially less than 100%, and no evidence of fusibility, when these characteristics are determined by the tests herein described. The fully cured or thermoset state is most specifically indicated by the lack of manifestation of fluidity at 375° C. when determined by the test heretofore described.

The resins of this invention can be applied to many of the uses of conventional thermoset resins. Thus, when the polymerization has been carried only to a relatively low degree of completion, i.e., a fusible resin or even a mixture of the reactants, resins can be used as an impregnant to fill the voids of porous media in order to reduce permeability or increase strength; the polymerization is then carried out or completed in the pores, leaving them filled with the thermoset form of the resin. Or, the resins can be mixed with fibrous or granular fillers such as asbestos, slatedust, etc., and the "molding powders" thus prepared can be formed into useful shapes by molding and extruding. The resin in the formed shape then can be converted to the substantially infusible and relatively insoluble state by further heating carried out either as a part of the forming operation or as a separate step following the forming operation. The resin, either as a molten fluid or as a varnish can be used as a laminating resin with, for example, asbestos or glass fiber felt. The resin can be fully cured to the substantially infusible and relatively insoluble form and used as a filler or as an abrasive or frictional agent.

The resins of this invention are particularly useful because of certain properties not commonly found in resinous materials. In their substantially infusible and relatively insoluble state they are characterized, other than by solubility, volatility, and fusibility hereinbefore discussed, by being hard, shiny, black materials solid at 25° C. These resins unlike many conventional resins, are excepionally stable to heat and to numerous corrosive agents. Thus, at 350° C., where many resinous materials are completely decomposed, the thermoset resins of this invention are completely stable; and even at higher temperatures, e.g. 400° C., where most resins carbonize and/or depolymerize, the thermoset resins of this invention show only moderate weight loss and the residue remains a shiny, black, resinous-appearing material.

Typical behavior of the resins of this invention at high temperatures in the absence of oxidizing gases is illustrated by the following data; obtained by heating five resins prepared from a medium coal tar pitch of commerce and m-dinitrobenzene as oxidizing reagent; the resins being first fully cured at 300° C.:

| Resin No. | Amount of oxidizing reagent used, percent of pitch | Weight loss, percent of resin fully cured at 300° C. at— | |
|---|---|---|---|
| | | 350° C. | 450° C. |
| 1 | 17.7 | Nil | 12.1 |
| 2 | 17.7 | Nil | 9.5 |
| 3 | 25.0 | Nil | 5.9 |
| 4 | 17.7 | Nil | 14.8 |
| 5 | 11.1 | Nil | 17.8 |

Similarly the resistance of the resins of this invention to destructive oxidation by air is exceptional. Resistance to air oxidation of any resin varies with its physical form, rate of attack depending primarily on the extent of surface presented to the action of the corrosive agent. Thus a resin will be attacked most rapidly if it is spread in a thin film on a surface readily accessible to the air. To demonstrate the resistance of the resins of this invention, there are prepared porous formed shapes (blocks ½″ x 3″ x 1½″ by coating particles of filler with fusible form of the resin, compression molding into the desired shape, then completing the cure of the resin by heating at 250° C. in an oven. The cured blocks thus obtained are exposed to air in an oven at 250° C. for several weeks, weight change being determined from time to time. Results are as follows:

| Filler | Weight change, percent of resin content of fully cured blocks after heating at 250° C. for— | | | | | |
|---|---|---|---|---|---|---|
| | 1 day | 2 days | 9 days | 16 days | 31 days | 60 days |
| Silica, approximately 40 mesh | +1.4 | +1.7 | +0.7 | −0.2 | −4.0 | −11.5 |
| Carbon, approximately 200 mesh | +0.5 | +0.4 | +0.9 | +1.5 | +0.7 | −6.6 |

It is thus shown that the resin, even when readily accessible to attack as a film on the surface of filler particles is highly resistant to air oxidation for periods of at least several weeks. It was also observed that the resin of this invention will withstand exposure to air at 350° C. for periods of at least several hours when it is spread in a film of about one mm. thickness.

The resins of this invention also are highly resistant to corrosive attack by chemical agents other than air, for example, caustic solutions, oxidizing acids such as nitric and sulfuric acids and other acids such as acetic, hydrochloric and phosphoric, and solvents such as alcohols, hydrocarbons and ketones. As a method of obtaining a measure of the resistance of these resins to some of these agents, there is used the procedure described by W. H. Adams et al., Chemical Engineering, July 1949, page 85. In this procedure, the resin with or without filler is made into formed pieces, which are then exposed to the action of the test solutions at controlled temperatures. After exposure, resistance ratings are assigned on the basis of specific observations and measurements made on the test pieces and the solutions to which they have been exposed.

In applying the Adams' resistance ratings to the resins of this invention partially cured resin and a carbon filler are formed into pieces similar to those used for tests of air oxidation resistance discussed above. These are then fully cured at 250° C. and are cut into small test samples approximately ⅜″ x ⅜″ x ¾″, which are used to obtain Adams' ratings. For resistance to nitric acid and sodium hydroxide, average ratings of at least 90 are obtained as follows:

| Reagents | Concentration, percent | Temp. of test, ° C. | Weight change of sample | Volume change of sample | Appearance of sample | Appearance of solution | Average rating |
|---|---|---|---|---|---|---|---|
| Sodium hydroxide | 20 | 25 | 100 | 98 | 100 | 100 | 99.5 |
| Do | 20 | 100 | 94 | 100 | 100 | 90 | 96.0 |
| Do | 50 | 25 | 100 | 100 | 100 | 100 | 100 |
| Nitric acid | 5 | 25 | 100 | 98 | 100 | 100 | 98.8 |
| Do | 5 | 100 | 88 | 93 | 100 | 95 | 94.0 |
| Do | 10 | 25 | 93 | 93 | 100 | 100 | 97.0 |
| Do | 15 | 25 | 100 | 90 | 100 | 100 | 97.5 |

Thus when the resin of this invention is substantially completely cured, it has an Adams' rating of at least 90 when treated with 20% sodium hydroxide at 100° C. and when treated with 5% nitric acid at 100° C.

EXAMPLE 10

A practical method of producing the thermoset compositions of this invention is to completely cure a partially cured resinous composition with or without other ingredients such as fillers. This complete curing is effected at temperatures between 250° and 350° C., preferably between 275° and 325° C., and most desirably at about 300° C. If the partially cured resinous composition is in the form of a molding compound, the application of super-atmospheric pressures of the order of 1000 to 4000 pounds per square inch is desirable.

The partially cured resinous material employed for this purpose is solid at 25° C., has a draw point of 175° to 275° C., preferably 200° to 260° C., and benzene-soluble components of 25 to 60%, preferably 35 to 45%.

The draw point of the partially cured resinous material is determined by heating a block of metal, fitted with a device for measuring its temperature sufficiently to allow the application of a thin layer or smear of the resin to be tested. The metal block is then allowed to cool while a sharp metal point is drawn across the surface of the smear. The minimum temperature at which a metal or draw line can be observed to be made by the metal point is the draw point of the resin. As the term "drawn point" is used herein this maximum temperature is meant. It has been found that the draw point is related to more conventional properties such as softening or melting point, flow rate, etc. Determination of draw point has the advantage as a criterion of degree of cure over other tests in that it can be carried out in a few minutes while a polymerization reaction is being carried out.

Partially cured thermosetting resins, which may be employed for the production of the thermoset resins of this invention, were produced, for example, by reacting a medium coal tar pitch which conformed to the requirements of the pitch heretofore defined and m-dinitrobenzene in the proportion by weight of 85 parts of pitch to 15 parts of the m-dinitrobenzene. Desirably, the temperature of the mixture of the hydrocarbonaceous pitch and the oxidizing agent is gradually increased within the range of 165° to 275° C. at a sufficiently slow rate of increase to avoid excess foaming and the heating is continued until the rate of increase of the draw point of the reaction product is less than 3° C. per hour while the temperature is maintained substantially constant. The reaction mixture is solid at 275° C. for varying periods of time as indicated in the following table:

*Preparation of Resins at 275° C.*

| Preparation No. | Total time in oven, minutes | Yield, percent of combined pitch and m-dinitrobenzene | Draw point, °C. | Solubility in benzene, percent |
|---|---|---|---|---|
| 1 | 10 | 94.0 | 180 | 47 |
| 2 | 15 | 94.0 | 267 | 35 |
| 3 | 20 | 91.5 | 265 |  |
| 4 | 25 | 92.0 |  | 33 |
| 5 | 30 | 90.0 |  | 29 |
| 6 | 45 | 90.0 |  | 31 |
| 7 | 60 | 90.0 |  | 32 |

Preparations designated as 1, 2 and 3 conform to the requirements of the partially cured thermosetting resins, and such partially cured thermosetting resins can be readily converted to the thermoset compositions by heating within the range of 250° C. to 350° C. For example, as shown in the above table, the heating of such resins at 275° C. for a sufficient period of time will produce infusible thermoset resins, as for example, those designated as preparation Nos. 4, 5, 6, and 7 in the above table.

The fully cured or thermoset state is indicated by the lack of manifestation of fluidity of the resin at 375° C. when determined by the test heretofore described. In many, but not all, cases the thermoset state can be ascertained by the benzene-soluble components and when they are less than 20%, the thermoset state has been reached. However, if the benzene-soluble components exceed 20%, the resin might still be thermoset. This is illustrated by the thermoset compositions designated as preparations 4, 5, 6 and 7 in the above table in which the benzene-soluble component is significantly greater than 20%. It is found that the benzene-soluble component falls to the 20% level when such thermoset resins are heated over longer periods of reaction time.

EXAMPLE 11

A glass mat of the type used commercially for the manufacture of laminates is cleaned of sizing and other foreign material by heating in an oven at 300° C. Until no visible fumes or vapors are evolved. As the sizing is removed, the structure of the mat expands, providing greater space between the fibers. Pieces of the cleaned mat 4" square are treated with powdered, thermosetting resin, as described in Example 1–10, by spreading the powder uniformly over the surface, then vibrating the mat to cause the resin particles to fall into the interstices of the mat. The resin has a softening point of 210° C., and is used in an amount equal to 10% of the weight of the glass. Six squares of glass mat, enough to form a pile about 1" in length when lightly compressed as described below, are placed on an aluminum plate. A second plate is placed on top of the pile, and on top of the second plate a 4 lb. weight. The mat thus confined under a pressure of about 4 oz. per square inch, is placed in an oven at 250° C. for about 15 minutes. During this time the mat and resin approach the temperature of the oven. The resin melts to a liquid of fairly low viscosity, and because of its poor wetting property most of it collects as small droplets at the points where the randomly-arranged glass fibers are in contact. The preheated mat and its restraining weight then are transferred to an oven at 300° C. for one half hour to effect final cure. When the restraining weight is removed, the mat is held by the thermoset resin in the form of a coherent block with sufficient strength for use as insulation, filtering bodies, and the like.

EXAMPLE 12

The commercial product known as mineral wool, which is usually slag spun into fibrous form, is obtained as bulk material in the form of loose clumps as ordinarily used for building insulation. A sample of this material is first plucked apart and spread in a layer, then sprinkled with 15% by weight of the same powdered thermosetting resin used in Example 11. The loose mixture is then rolled in a jar mill to distribute the powder through the fibers, then spread in the bottom of a metal pan 4" square to form a layer about ¾" deep when compressed. An aluminum plate, 3¾" square, within the pan and on top of the fiber-resin mixture, supports a 4 lb. weight to compress the mixture at about 4 oz. per square inch. The pan, containing the compressed mixture, is heated first at 250° C., then at 300° C., as described in Example 11. When removed from the pan, the fibers are bonded by the thermoset resin in a highly porous coherent block.

EXAMPLE 13

One part of a thermosetting resin as described in Examples 1–10, with a softening point of 200° C., is dispersed in 3 parts by weight of toluene by blending the mixture in a homogenizer. The dispersion is poured over fibrous aluminum oxide in amount sufficient to provide one part of resin and 5 parts of fibers by weight in the mixture. Thereafter, the mixture is stirred to insure that all the fibers are wet with the resin dispersion. The wet mixture is spread over the bottom of the metal pan used in Example 12 and confined at one ounce per square inch by use of a suitable plate and weight. The confined mixture first is heated at 150° C. to remove the toluene. Then it is heated at 250° C. and at 300° C. as in Example 11. After heating, the fibers are bonded by the resin to form a block 4" square and about ¾" in thickness.

As hereinbefore described, resins used for the preparation of loosely packed fibrous bodies preferably are thermosetting resins which can be converted by further cure to a thermoset condition. However, a thermoplastic resin can be used if its softening temperature is high enough to withstand the conditions under which the fibrous body is to be used.

The preparation of thermoplastic resinous materials of very high softening point is accomplished as disclosed in my copending application Serial No. 793,707, now Patent No. 2,992,935.

Like the thermosetting resins of this invention, the thermoplastics show a similar low degree of wetting of mineral fibers, hence are useful for making loosely packed bodies with such fibers. The preparation of a thermoplastic resin and its use in making a fibrous body are illustrated in Example 14.

EXAMPLE 14

A mixture of 92.5 parts of pitch and 7.5 parts of m-dinitrobenzene is heated at 185°–250° C. for 4 hours, then at 250° C. for 12 hours. The draw point of the product is 265° C. It is thermoplastic, not thermosetting. Further heating at 250° C. will not advance the cure because insufficient oxidizing agent is used to effect complete cure. The resin is ground and dispersed among the fibers of a pile of glass mat as described for the thermosetting resin of Example 11. The confined pile of mat is placed in an oven at 325° C. At this temperature the thermoplastic resin melts to a liquid, and, though it does not thermoset, the liquid forms droplets at the points of contact of the fibers. When the restrained mat is subsequently cooled, the droplets harden, forming bonds which hold the fibers together. When the restraining weights are removed, the fibers are held together to form a loosely packed fibrous body. The body can be heated as high as 200° C. without damage to the bonds.

Although the invention has been illustrated in connection with certain specific reactions, ingredients and proportions of ingredients, it will be apparent that modifications and changes may be made without departing from the spirit and scope of the invention.

I claim:

1. In a process for preparing a bonded fibrous body, the steps of applying to a mass of compressed mineral fibers a hydrocarbonaceous resin having a draw point of 175–275° C. having 25 to 60% of benzene-soluble components, heating said resin to melt the same in contact with said mass of fibers, and then curing said body at a temperature above 300° C.

2. The process of claim 1 in which the resin has a draw point within the range of 200–260° C.

3. In a process for preparing a bonded fibrous body, the steps of compressing a mass of fibers, applying thereto a hydrocarbonaceous resin having a draw point of 175–275° C. having 25 to 60% of benzene-soluble components, heating said resin to cause the same to flow in contact with said fibers, and curing the resin at a temperature above 300° C.

4. The process of claim 3 in which the resin is comminuted and dispersed through the fibrous body and the fibrous body maintained under compression during the melting and curing of the resin.

5. The process of claim 3 in which the resin is ground to a powder and the powder dispersed through the fibrous body.

6. The process of claim 3 in which the resin is dissolved in a solvent and the solvent distributed through the fibrous body, the solvent being evaporated during the heating of the resin.

7. In a process for preparing a fibrous batt, the steps of compressing highly dehydrated mineral fibers, applying to the fibers a hydrocarbonaceous resin having the property of not substantially wetting said fibers when the resin is melted, said resin having a draw point of 150–275° C. and being thermosetting, solid at 25° C., and having from 25% to 60% of benzene-soluble components, heating the mixture to melt the resin and bring the resin into engagement with fibers at their point of contact, and continuing the heating to thermoset said resin.

8. The process of claim 7, in which said resin is heated above 250° C. to melt the resin and the compressed fibrous body is then cured in an oven at a temperature above 300° C. to thermoset the resin.

9. In a process for forming a mineral fiber batt, the steps of lightly compressing highly dehydrated mineral fibers to bring the fibers into contact with each other, bringing a hydrocarbonaceous resin into contact with said fibers, said resin having the property of not substantially wetting said fibers when melted and in contact with the fibers, but forming bonds between said fibers at points of contact between the fibers, said resin being thermosetting, solid at 25° C., having a draw point within the range of 200–260° C. and having benzene-soluble components of 35–45%, heating the compressed fibers and resin to melt the resin, and continuing said heating to convert said resin into a substantially infusible thermoset resin.

10. The process of claim 9, in which said resin, when introduced into said fibers, is a powdered resin.

11. In a method for forming a bonded fibrous body, the steps of compressing highly dehydrated mineral fibers to bring the fibers into contact with each other, melting a resin which clings to said fibers only at points of contact between fibers, said resin having a draw point of 150–275° C. and being thermosetting, solid at 25° C., and having 25% to 60% of benzene-soluble components, and curing said resin at a temperature between 165° and 400° C. to convert the resin into a thermoset resin.

12. In a process for forming a mineral fiber batt, the steps of compressing the fibers to bring them into crossing contact, applying a thermosetting fluid resin having the property of not wetting the fibers so as to cling to the fibers only at said points of contact, and heating said batt to thermoset said resin, said resin being a partially-cured, essentially hydrocarbonaceous resinous material being solid at 25° C., having a draw point of 150–275° C., and having 25 to 60% of benzene-soluble components.

13. The process of claim 12, in which said thermoset resin has an Adams resistance rating of at least 90 when treated with 20% sodium hydroxide at 100° C. and which manifests no fluidity at 375° C.

14. A fibrous body, comprising compressed mineral fibers having crossing contact with each other, and a thermoset resin bonding said fibers at said point of crossing and said resin being hydrocarbonaceous, being solid at 25° C., having less than 35% benzene-soluble components, manifesting no fluidity at 375° C. and yielding a carbon residue of at least 65% and substantially less than 100% by weight when heated to 950° C. in the absence of oxygen.

15. The structure of claim 14, in which said resin has an Adams resistance rating of at least 90 when treated with 20% sodium hydroxide at 100° C.

References Cited in the file of this patent

UNITED STATES PATENTS

| | | |
|---|---|---|
| 2,288,072 | Collins | June 30, 1942 |
| 2,376,687 | Goldstein et al. | May 22, 1945 |
| 2,544,019 | Heritage | Mar. 6, 1951 |
| 2,568,144 | Cremer et al. | Sept. 18, 1951 |
| 2,900,291 | O'Connell | Aug. 18, 1959 |

FOREIGN PATENTS

| | | |
|---|---|---|
| 440,311 | Great Britain | Dec. 24, 1935 |

UNITED STATES PATENT OFFICE
CERTIFICATE OF CORRECTION

Patent No. 3,066,061

November 27, 1962

Nathaniel M. Winslow

It is hereby certified that error appears in the above numbered patent requiring correction and that the said Letters Patent should read as corrected below.

Column 3, line 32, for "resinous" read -- thermoset --; column 17, line 51, for "Until" read -- until --.

Signed and sealed this 14th day of May 1963.

(SEAL)
Attest:

ERNEST W. SWIDER
Attesting Officer

DAVID L. LADD
Commissioner of Patents